United States Patent
Sakamaki et al.

(10) Patent No.: US 8,253,683 B2
(45) Date of Patent: Aug. 28, 2012

(54) LIQUID CRYSTAL DISPLAY DRIVE AND CONTROL DEVICE, MOBILE TERMINAL SYSTEM, AND DATA PROCESSING SYSTEM

(75) Inventors: Goro Sakamaki, Tokyo (JP); Shin Morita, Tokyo (JP); Kazuhiko Kanda, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1120 days.

(21) Appl. No.: 11/441,041

(22) Filed: May 26, 2006

(65) Prior Publication Data

US 2006/0267925 A1    Nov. 30, 2006

(30) Foreign Application Priority Data

May 30, 2005    (JP) ................. 2005-156938

(51) Int. Cl.
   *G09G 3/36*    (2006.01)
(52) U.S. Cl. .......... 345/104; 345/204; 345/55; 345/87
(58) Field of Classification Search .......... 345/204–206, 345/55, 87, 104
   See application file for complete search history.

(56) References Cited

U.S. PATENT DOCUMENTS

| | | | | |
|---|---|---|---|---|
| 6,760,772 B2 | 7/2004 | Zou et al. | | 709/230 |
| 7,034,792 B2 | 4/2006 | Tamura | | |
| 7,046,232 B2 * | 5/2006 | Inagaki et al. | | 345/158 |
| 7,061,459 B2 | 6/2006 | Koizumi | | |
| 7,489,303 B1 * | 2/2009 | Pryor | | 345/173 |
| 7,622,863 B2 | 11/2009 | Seo et al. | | |
| 2002/0011998 A1 * | 1/2002 | Tamura | | 345/204 |
| 2006/0053244 A1 * | 3/2006 | Fruhauf et al. | | 710/313 |

FOREIGN PATENT DOCUMENTS

| | | |
|---|---|---|
| JP | 11-045073 | 2/1999 |
| JP | 2001-222249 | 8/2001 |
| JP | 2001-222276 | 8/2001 |
| JP | 2002-341831 | 11/2002 |
| JP | 2004-531916 | 10/2004 |
| JP | 2005-038838 | 2/2005 |
| WO | WO 02/49314 | 6/2002 |

OTHER PUBLICATIONS

Japanese Office Action in Japanese App. No. 2005-156938 (and English translation).
Chinese Office Action in Chinese App. No. 200610087748.5 (and English translation).

* cited by examiner

*Primary Examiner* — Alexander Eisen
*Assistant Examiner* — Christopher E Leiby
(74) *Attorney, Agent, or Firm* — Miles & Stockbridge P.C.

(57) ABSTRACT

It is intended to reduce the number of exclusive signal interconnections for connecting a host module to a liquid crystal display driver for a sub-display, and peripheral devices, respectively.
A liquid crystal display drive and control device comprises, over one semiconductor substrate, a host interface circuit, a drive circuit, and an output port. The host interface circuit is used for connection with the host module. The drive circuit generates a drive signal for driving a liquid crystal display on the basis of information inputted to the host interface circuit before outputting. The output port is capable of controlling a logic level of an output signal on the basis of the information inputted to the host interface circuit. The liquid crystal display drive and control device is capable of performing the function of distributing signals to circuits subjected to control by level signals with determined logic levels, respectively, such as strobe control of a liquid crystal display driver for a sub-display, control of peripheral devices including a camera flashlight, and so forth.

25 Claims, 10 Drawing Sheets

LIQUID CRYSTAL DISPLAY DRIVE AND CONTROL DEVICE, MOBILE TERMINAL SYSTEM, AND DATA PROCESSING SYSTEM

CROSS REFERENCE TO RELATED APPLICATION

The present application claims priority from Japanese patent application No. 2005-156938 filed on May 30, 2005, the content of which is hereby incorporated by reference into this application.

BACKGROUND OF THE INVENTION

The invention relates to a liquid crystal display drive and control device, and further, relates to a mobile terminal system, and a data processing system, comprising the liquid crystal display drive and control device, being concerned with a technology effective for application to for example, a mobile telephone.

The mobile telephone is provided with a radio-frequency interface, a baseband unit, a liquid crystal display drive and control device, a liquid crystal display, a microphone, a speaker, and so forth. In the case where a collapsible structure is adopted for an enclosure housing circuits of those components, a pair of cases are joined together at a hinge in such a way as to be folded and unfolded. If the liquid crystal display drive and control device, and the liquid crystal display are disposed in one of the cases, the baseband unit for providing the liquid crystal display drive and control device with display commands and display data, together with the radio-frequency interface, is often disposed in the other case. If the baseband unit, and the liquid crystal display drive and control device are disposed in the individual cases, separated from each other, a multitude of signal lines for interconnecting both the baseband unit, and the liquid crystal display drive and control device need to be drawn through the hinge.

As the liquid crystal display that is driven by the liquid crystal display drive and control device becomes higher in definition, and the number of display colors increases, there is seen a tendency of an increase in the number of metal interconnections between the baseband unit, and the liquid crystal display drive and control device. Further, in the case where a sub-display for making up a monitor screen, and so forth, used for moving pictures, and still pictures, as well as peripheral devices, such as a camera flashlight, an LED used for illumination display, and so forth, are disposed in the same case where the liquid crystal display is disposed as a result of a higher functional level of the mobile telephone, there results a further increase in the number of interface signal lines for control of those constituents. With a conventional liquid crystal display drive and control device, display data and display commands are fed from a host module such as a baseband unit via parallel buses as disclosed in Patent Document 1. Further, in many cases, a packet in a predetermined format is used for feeding the display data and display commands. As for the packet for such an application, use is being made of packets in various formats other than that described in Patent Document 1.

[Patent Document 1]
Japanese Unexamined Patent Publication No. 2001-222276
[Patent Document 2]
Japanese Unexamined Patent Publication No. 2004-53191.6, which corresponds to PCT Publication No. WO 2002/049314 which corresponds to PCT application No. PCT/US2001/047807.

SUMMARY OF THE INVENTION

The inventors have carried out studies on a liquid crystal display drive and control device capable of coping with a higher functional level of a mobile terminal system or a data processing system, as represented by a mobile telephone, with greater ease.

A first problem for the studies has been how to reduce the number of signal lines between a host module and the liquid crystal display drive and control device. The inventors have examined use of a high-speed serial interface. However, it has been found out that if a bridge circuit for the high-speed serial interface is disposed between the host module and the liquid crystal display drive and control device in order to cope with the problem, there will arise the need for a semiconductor device, and so forth, for the bridge circuit, resulting in an increase in cost. Further, in such a case, when control of a sub-display and peripheral devices is also taken into consideration, this problem similarly need be coped with by use of a high-speed serial interface. Accordingly, it becomes necessary for the bridge circuit to perform a function of distributing signals to not only the liquid crystal display drive and control device, but also to the sub-display and the peripheral devices, thereby rendering the control complicated, and consequently, the inventors have found out that there exists the risk of deterioration in operability.

The inventors have further examined how to cope with the higher functional level with greater ease while preventing complication of the control of commands directed to the liquid crystal display drive and control device, including the control of the sub-display and the peripheral devices. In the case of using a packet in a predetermined format, classification information and address information are included in a header part of the packet, and the liquid crystal display drive and control device stores commands and data at an address specified by the address information to thereby execute drive-control. The commands and data are included in a body part of the packet. The address specified by the address information is an address of an image memory, or an address of a control register for storing the command or decoding information thereof. In a packet addressing system, there are included a single access whereby an access is made to an address directly specified by the address information, and a multi-access whereby an access is made to respective addresses sequentially incremented with the address directly specified by the address information as a base point. In the case of the multi-access, necessary addresses need be linearly consecutive. If the necessary addresses are interrupted, the single access needs be made many times. In reality, address mapping for the control register turns out discontinuous depending on a control target, the content of control, a version of the liquid crystal display drive and control device, and so forth. This being the case, the inventors have found out that there is the risk of complication arising in setting the address information that is necessary for the host module to make access to the control register in the header part of a packet.

It is therefore an object of the invention to provide a liquid crystal display drive and control device capable of coping with a higher function of a mobile terminal system or a data processing system, with greater ease.

Another object of the invention is to reduce the number of signal lines running through an interface between the host module and the liquid crystal display drive and control device.

A still another object of the invention is to provide a mobile terminal device or a data processing system, excellent in operability, and capable of easily controlling not only the liquid crystal display drive and control device, but also a sub display, peripheral devices, and so forth.

It is a further object of the invention to provide a liquid crystal display drive and control device capable of attaining command control by a host module with greater ease, and enhancing flexibility of control, and further, to provide a mobile terminal device or a data processing system, employing the liquid crystal display drive and control device.

The above and other objects, features and advantages of the present invention will be apparent from the following detailed description of the preferred embodiments of the invention in conjunction with the accompanying drawings.

Outlines of the representative embodiments of the invention, disclosed in the present application, are briefly described as follows.

(1) [Liquid Crystal Display Drive and Control Device]

A liquid crystal display drive and control device (10) comprises a host interface circuit 20, a drive circuit 21, and an output port 22, provided on one piece of semiconductor substrate. The host interface circuit is used for connection with a host module. The drive circuit generates a drive signal for driving a liquid crystal display (11) on the basis of information inputted to the host interface circuit before outputting the drive signal. The output port is capable of controlling a logic level of an output signal on the basis of the information inputted to the host interface circuit.

From the above, it is possible for the liquid crystal display drive and control device 10 to perform the function of distributing signals to circuits subjected to control by level signals with determined logic levels, respectively, such as strobe control of a liquid crystal display driver for a sub-display, control of peripheral devices including LEDs for camera flashlight, and illumination display, and so forth. Accordingly, it need only be sufficient for the host interface circuit to receive information intended for the liquid crystal display driver for a sub display, and the peripheral devices from the host module. Hence, it becomes possible to reduce the number of exclusive signal interconnections for connecting the host module to the liquid crystal display driver for a sub-display, and the peripheral devices, respectively.

According to a specific mode of the invention, the output port preferably comprises a plurality of port terminals (OPORTO-8), and port registers (26), and data for deciding an output logic value of each of the port terminals is set in the respective port registers.

According to another specific mode of the invention, the liquid crystal display drive and control device preferably further comprises a display memory (43) for storing display data, and the drive circuit generates a gate driver signal (G1-320) and a source drive signal (S1-720), for driving a liquid crystal display according to the display data stored in the display memory before outputting those signals.

According to still another specific mode of the invention, the host interface circuit preferably comprises a first serial interface circuit (25) to be interfaced with the host module. The first serial interface circuit preferably comprises differential terminals (data ±) for input/output of serial data. With the first serial interface circuit for inputting/outputting the serial data in a differential method, it is possible to execute high-speed serial interfacing at low amplitude.

According to a further specific mode of the invention, the host interface circuit preferably further comprises a parallel interface circuit, and a mode terminal (IM 3-0) for determining which of the first serial interface circuit and the parallel interface circuit (33) is to be used as an interface with the host module. If the host module is in support of low-amplitude high-speed serial interfacing by the first serial interface circuit, adoption of the first serial interface will result in further reduction in the number of signal lines for use in interfacing with the host module. In the case where the host module is not in support of the low-amplitude high-speed serial interfacing by the first serial interface circuit, selection of a conventional parallel interface will suffice, so that it is possible to ensure flexibility of a system configuration.

According to a still further specific mode of the invention, in an operation mode of using the first serial interface circuit as an interface with the host module, the host interface circuit preferably enables information received by the first serial interface circuit to be outputted to the drive circuit, or to be outputted from the parallel interface circuit to outside. In the case where a different liquid crystal display driver (12) for a sub-display is connected to the outside, the liquid crystal display drive and control device comes to be capable of performing not only outputting of signals via the output port, but also outputting of display data from the parallel interface circuit. When the host interface circuit outputs the information received by the first serial interface circuit from the parallel interface circuit to outside in the operation mode of using the first serial interface circuit as the interface with the host module, the host interface circuit outputs strobe signals (CS, WR, and RS) necessary for parallel interfacing from the output port to the outside. That will further promote reduction in the number of the exclusive signal interconnections for connecting the host module to the liquid crystal display driver for the sub-display, and the peripheral devices, respectively.

According to a yet further specific mode of the invention, the host interface circuit preferably comprises a frame-synchronizing signal output terminal (FMARK) capable of outputting a frame-synchronizing signal for instructing timing for fetching the display data by frame synchronization. For example, the frame-synchronizing signal is a signal indicating the head of a display frame. The liquid crystal display drive and control device feeds the host module with the frame-synchronizing signal, whereupon the host module becomes capable of feeding the display data, and so forth to the liquid crystal display drive and control device, in synchronization with the frame-synchronizing signal. At this point in time, in the operation mode of using the first serial interface circuit as the interface with the host module, the host interface circuit enables the frame-synchronizing signal ((FLM (sub)) inputted from the outside to be outputted from the frame-synchronizing signal output terminal to the host module when image information received by the first serial interface circuit can be outputted from the parallel interface circuit to the outside. As a result, when the liquid crystal display drive and control device feeds the display data from the parallel interface circuit to the sub liquid crystal display drive and control device, the sub liquid crystal display drive and control device is capable of fetching the display data in synchronization with the head of a frame.

(2) [Serial Communications]

A liquid crystal display drive and control device comprises a host interface circuit usable for connection with a host module, and a drive circuit. The drive circuit generates a drive signal for driving a liquid crystal display on the basis of information inputted to the host interface circuit before outputting. The host interface circuit comprises a first serial interface circuit to be interfaced with the host module, and a second serial interface circuit (40) differing in communication speed from the first serial interface circuit. The first serial interface circuit comprises differential terminals for input/output of serial data. With the first serial interface circuit for inputting/outputting the serial data in a differential method, it is possible to execute high-speed serial interfacing at low amplitude. Adoption of the first serial interface will result in further reduction in the number of signal lines for use in interfacing with the host module.

According to a specific mode of the invention, the liquid crystal display drive and control device preferably further comprises a mode terminal (IM 3-0) for determining which of the first serial interface circuit and the second serial interface circuit is to be used as an interface with the host module.

According to another specific mode of the invention, the host interface circuit preferably further comprises a parallel interface circuit. In this case, the host interface circuit preferably further comprises a mode terminal for determining which of the first serial interface circuit, the second serial interface circuit, and the parallel interface circuit is to be used as an interface with the host module. If the host module is in support of low-amplitude high-speed serial interfacing by the first serial interface circuit, adoption of the first serial interface will result in further reduction in the number of signal lines for use in interfacing with the host module. In the case where the host module is not in support of the low-amplitude high-speed serial interfacing by the first serial interface circuit, selection of the conventional parallel interface or the second serial interface circuit will suffice, so that it is possible to ensure flexibility of the system configuration.

According to still another specific mode of the invention, in an operation mode of using the first serial interface circuit as the interface with the host module, the host interface circuit enables information received by the first serial interface circuit to be outputted from the parallel interface circuit to outside. In the case where a different liquid crystal display driver for a sub-display is connected to the outside, the liquid crystal display drive and control device is capable of causing the parallel interface circuit to perform outputting of display data to the different liquid crystal display driver.

According to a further specific mode of the invention, the host interface circuit preferably further comprises a frame-synchronizing signal output terminal capable of outputting a frame-synchronizing signal for instructing timing for fetching the display data by frame synchronization. For example, the frame-synchronizing signal is the signal indicating the head of the display frame. The sub liquid crystal display drive and control device feeds the host module with the frame-synchronizing signal, whereupon the host module becomes capable of feeding the display data, and so forth to the sub liquid crystal display drive and control device, in synchronization with the frame-synchronizing signal. At this point in time, in the operation mode of using the first serial interface circuit as the interface with the host module, the host interface circuit enables the frame-synchronizing signal inputted from the outside to be outputted from the frame-synchronizing signal output terminal to the host module when image information received by the first serial interface circuit can be outputted from the parallel interface circuit to the outside. As a result, when the liquid crystal display drive and control device feeds the display data from the parallel interface circuit to the sub liquid crystal display drive and control device, the sub liquid crystal display drive and control device is capable of fetching the display data in synchronization with the head of the frame.

(3) [Mobile Terminal System]

A mobile terminal system comprises a liquid crystal display drive and control device (10), and a host module (5), having a plurality of signal lines (18) interconnecting the liquid crystal display drive and control device and the host module. Parts of the signal lines serve as differential signal lines through which information transmission is executed by serial interfacing. High-speed serial interfacing low in amplitude can be executed by the liquid crystal display drive and control device, and the host module by making use of the differential signal lines. Hence, a necessary transfer rate can be obtained even with a fewer number of the signal lines in comparison with the number of bus signal lines used for executing parallel interfacing.

According to a specific mode of the invention, the mobile terminal system preferably comprises a first case (15), and a second case (17) joined with the first case in such a way as to be folded and unfolded with a hinge (16) interposed therebetween. The first case preferably comprises a liquid crystal display drive and control device, and a liquid crystal display (11) driven thereby. The second case preferably comprises the host module. The plurality of signal lines run through the hinge. Because the number of the signal lines can be reduced, it is possible to significantly reduce the risk of the signal lines 18 being broken over time due to repeated folding and bending operations at the hinge 16.

According to another specific mode of the invention, the number of interconnections as the signal lines is preferably not more than ten lengths. According to still another specific mode of the invention, the signal lines preferably include two lengths of power supply lines (VCC, GND), four lengths of differential signal lines (Data±, Stb±) for serial interfacing, one length of a reset input signal line (RESET), and one length of a synchronizing signal line (FMARK). The four lengths of the differential signal lines for serial interfacing include inverting and noninverting differential signal lines, and inverting and noninverting differential clock lines.

According to a further specific mode of the invention, the liquid crystal display drive and control device preferably comprises a host interface circuit, a drive circuit, and an output port. The host interface circuit can be used for connection with the host module. The drive circuit generates a drive signal for driving a liquid crystal display on the basis of information inputted to the host interface circuit before outputting. The output port is capable of controlling a logic level of an output signal on the basis of the information inputted to the host interface circuit. The host interface circuit preferably comprises a first serial interface circuit for executing interfacing by use of the differential signal lines.

Thus, it is possible for the output port of the liquid crystal display drive and control device to perform the function of distributing signals to circuits subjected to control by level signals with determined logic levels, respectively, such as strobe control of a liquid crystal display driver for a sub-display, control of peripheral devices including LEDs for camera flashlight, and illumination display. Accordingly, for the host interface circuit to receive information for the liquid crystal display driver for the sub-display, and the peripheral devices from the host module will suffice. Consequently, it is possible to reduce the number of exclusive signal lines connecting the host module to the liquid crystal display driver for the sub-display, and the peripheral devices, respectively.

According to a still further specific mode of the invention, the output port preferably comprises a plurality of port terminals, and port registers, and control data for deciding an output logic value of each of the port terminals is set in the respective port registers.

According to one of yet further specific modes of the invention, the first case preferably comprises a backlight control device (28) connected to the output port. Further, the first case preferably comprises a flashlight control device (29) connected to the output port. Still further, the first case preferably comprises an LED control device (30) connected to the output port. Yet further, the first case preferably comprises a vibrator control device (31) connected to the output port. Further, the first case preferably comprises a liquid crystal display drive and control device (12) for a sub-panel, connected to the output port. Even if the first case comprises the backlight control device, the flashlight control device, the LED control device, the vibrator control device, and the liquid crystal display drive and control device for the sub-panel, because the output port performs the function of distributing signals from the host module among those devices, and there is therefore no need to install exclusive signal lines for feeding the signals from the host module to those devices, respectively.

According to another specific mode of the invention, the host interface circuit preferably comprises a parallel output circuit. The host interface circuit enables information received by the first serial interface circuit to be outputted to the drive circuit, or to be outputted from the parallel output circuit to the liquid crystal display drive and control device for the sub-panel. In the case where a different liquid crystal display driver (12) for a sub-display is connected to the outside, the liquid crystal display drive and control device (10) comes to be capable of performing not only outputting of signals via the output port (22), but also outputting of display data from the parallel interface circuit (33). That is, when the host interface circuit outputs the information received by the first serial interface circuit from the parallel interface circuit to the outside, the host interface circuit outputs strobe signals necessary for parallel interfacing from the output port to the different liquid crystal display driver for the sub-display. That will further promote reduction in the number of the exclusive signal interconnections for connecting the host module to the liquid crystal display driver for the sub-display, and the peripheral devices, respectively.

According to still another specific mode of the invention, the host interface circuit preferably comprises a frame-synchronizing signal output terminal (FMARK) capable of outputting a frame-synchronizing signal for instructing timing for fetching display data by frame synchronization. For example, the frame-synchronizing signal is a signal indicating the head of a display frame. The liquid crystal display drive and control device feeds the host module with the frame-synchronizing signal, whereupon the host module becomes capable of feeding the display data, and so forth to the liquid crystal display drive and control device, in synchronization with the frame-synchronizing signal. At this point in time, the host interface circuit enables the frame-synchronizing signal ((FLM (sub)) inputted from a liquid crystal display driver for sub-display to be outputted from the frame-synchronizing signal output terminal to the host module when image information received by the first serial interface circuit can be outputted from the parallel interface circuit to the liquid crystal display drive and control device for the sub-panel. As a result, even when the liquid crystal display drive and control device feeds the display data from the parallel interface circuit to the liquid crystal display drive and control device for sub display, the sub liquid crystal display drive and control device is capable of fetching the display data in synchronization with the head of a frame.

(4) [Packet]

A data processing system comprises a host module (5), a first peripheral device (10) connected to the host module, and a second peripheral device (12) connected to the first peripheral device. The host module transmits information to the first peripheral device by use of packets in a predetermined format. The packets each include a header part (HDR) and a body part (BDY). An address region (FLDa) of the header part can contain specific code information (splcd) capable of specifying the respective peripheral devices. A data region (FLDd) of the body part can contain data corresponding to address information. Upon detecting the specific code information out of the packet as received, the first peripheral device causes information of the body part to be held at either of the peripheral devices, corresponding to the specific code information. The peripheral device holding the information of the body part causes data or decoding information of the data to be held at an address specified by the address information of the body part to thereby execute internal control. The address information represents, for example, a command address, and the data at that time represents a command.

As a result of adopting a means described as above, the data region of the body part contains the data corresponding to the address information, so that even if assignment of addresses for holding data or decoding information of the data is not linear, but is out of order, the data or the decoding information thereof can be latched by peripheral devices with one packet. It need only be sufficient to prestore the address information and the data corresponding thereto, in pairs, in a memory, such as a ROM, and so forth, so as to be used by reading the same out of the ROM as necessary. In this case, capturing of addresses in the ROM will suffice for generation of packets, so that it is possible to do away with capturing addresses that are not in order by the peripheral device to thereby make setting of the address region of the header part. Thus, it becomes possible to facilitate an operation for setting data, and so forth in the respective peripheral devices.

Because it is possible to specify the peripheral devices that are to receive the data of the body part on the basis of the specific code information contained in the address region of the header part of a packet, it also becomes possible to control addresses of regions holding data, or decoding information of the data, and so forth for every local address region by the peripheral device. Accordingly, even if there is an increase in the number of secondary peripheral devices, an operation for setting data, and so forth in the peripheral circuits will not be complicated.

According to a specific mode of the invention, the header part containing the specific code information is capable of causing a plurality of data regions containing data units corresponding to respective pieces of address information to successively follow thereafter.

According to another specific mode of the invention, if the first peripheral device is unable to detect the specific code information out of the packet as received, the first peripheral device causes information of a data region to be held at an address specified by the address information of the address region. The information of the address region of the header part can be used as the address information on the data of the body part.

According to still another specific mode of the invention, the first peripheral device is a main liquid crystal display drive and control device connected to a main liquid crystal display, and the second peripheral device is sub liquid crystal display drive and control device connected to a sub liquid crystal display.

In accordance with an aspect of the invention, similar to the foregoing, a mobile terminal system comprises a liquid crystal display drive and control device, and a host module. The host module transmits information to the liquid crystal display drive and control device by use of packets in a predetermined format. The packets each include a header part and a body part. An address region of the header part can contain specific code information, and a data region of the body part can contain command data corresponding to command address information. When the liquid crystal display drive and control device detects the specific code information out of the packet as received, the liquid crystal display drive and control device causes the specific code information to hold command data or decoding information of the command data to be held at an address specified by the command address information of the body part succeeding thereto to thereby execute internal control. Even if assignment of addresses holding the command data, or decoding information of the command data is not linear, but is out of order, the command data, or the decoding information of the command data can be latched at predetermined addresses with one packet.

According to a specific mode of the invention, if the liquid crystal display drive and control device is unable to detect the specific code information out of the packet as received, the liquid crystal display drive and control device causes information of the data region to be held at an address specified by the address information of the address region.

According to another specific mode of the invention, packets that do not have the specific code information contained in the header part include a single access packet and a multi-access packet, and the liquid crystal display drive and control device causes information of a data region to be held at an address directly specified by the address information of the address region upon receiving the single access packet while the liquid crystal display drive and control device executes sequential address increments with the address directly specified by the address information of the address region used as a base point upon receiving the multi-access packet to thereby cause respective pieces of information of a plurality of succeeding data regions to be sequentially held at respective addresses as incremented.

Advantageous effects of the representative embodiments of the invention, disclosed in the present application, are briefly described as follows.

It is possible to cope with a higher function of a mobile terminal system or a data processing system, with greater ease.

It is possible to reduce the number of signal lines running through an interface between a host module and a liquid crystal display drive and control device.

It is possible to implement a mobile terminal device and a data processing system, excellent in operability, and capable of easily controlling not only the liquid crystal display drive and control device, but also a sub-display, peripheral devices, and so forth.

It is possible to attain command control by a host module in a liquid crystal display drive and control device, a mobile terminal device, and a data processing system, with greater ease, and further, to enhance flexibility of control.

DETAILED DESCRIPTION OF THE PREFERRED EMBODIMENTS

[Mobile Telephone]

Figure 2:
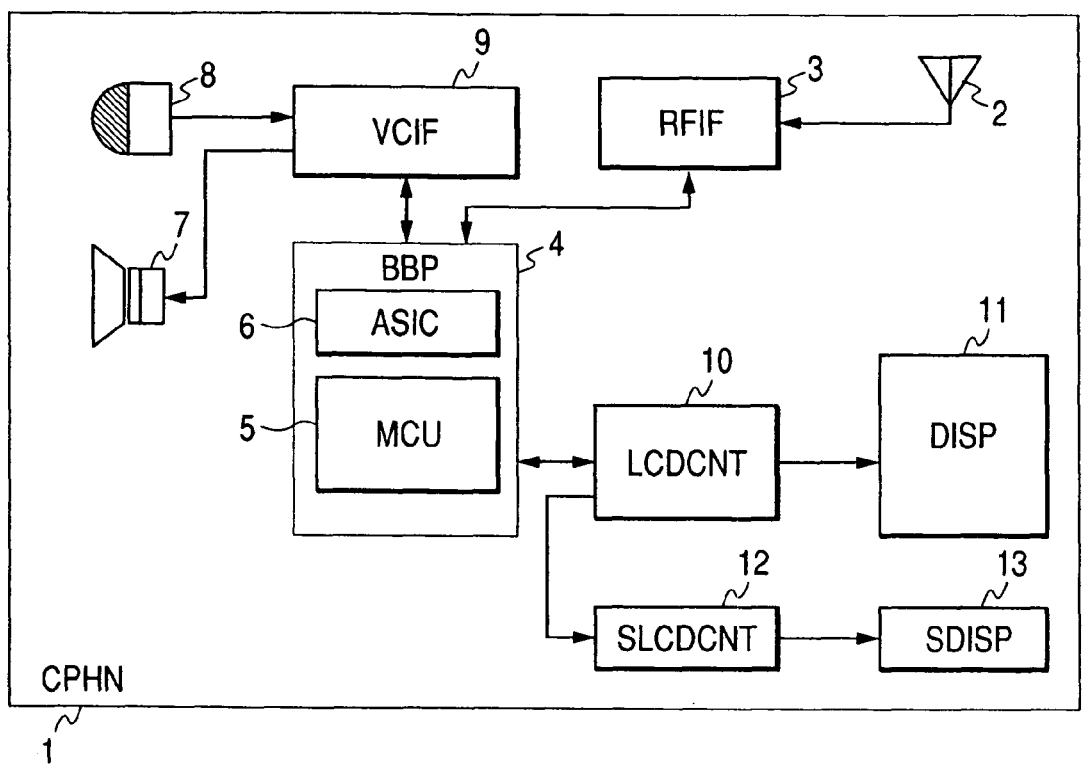
FIG. 2 is a block diagram broadly showing a configuration of the mobile telephone.

FIG. 2 shows a mobile telephone 1 by way of example. A received signal in a radio-frequency band, as received by an antenna 2, is sent out to a radio-frequency interface (RFIF) 3. The received signal is converted into a signal at a lower frequency by the radio-frequency interface 3 to be demodulated, and converted into a digital signal before being fed to a baseband unit (BBP) 4. The baseband unit 4 executes channel CODEC processing by use a microcomputer (MCU) 5 to thereby release the digital signal as received from encryption and execute error correction. Then, with the use of an application specific semiconductor device (ASIC) 6, the digital signal is divided into control data necessary for communications, and communications data such as compressed speech data, and so forth. The control data is sent out to the MCU 5, and the MCU 5 executes Communications Protocol processing, and so forth. The speech data as fetched by the channel CODEC processing is expanded by use of the MCU 5, and is converted into an analog signal by a speech interface circuit (VCIF) 9 to be thereby reproduced as speech from a speaker 7. In a transmission operation, a speech signal inputted from a microphone 8 is converted into a digital signal by the speech interface circuit 9, and is subjected to filter processing by use of the MCU 5, and so forth, to be thereby converted into a compressed speech data. The ASIC 6 generates a transmission data row by joining the compressed speech data with the control data from the MCU 5, and generates transmission data by adding an error correction/detection sign, and an encryption code to the transmission data row by use of the MCU 5. The transmission data is subjected to modulation/demodulation at the radio-frequency interface 3, and the transmission data having undergone modulation/demodulation is converted into a radio frequency signal to be then amplified before being sent out as a radio signal from the antenna 2.

The MCU 5 issues a display command, display data, and so forth, to a liquid crystal display (LCD) drive and control device (LCDCNT) 10. By so doing, the LCD drive and control device 10 executes control for displaying an image on a liquid crystal display (DISP) 11. The LCD drive and control device 10 executes control, and so forth, for bypassing the display command, display data, and so forth for displaying the image on a sub liquid crystal display 13 to thereby feed the same to a sub LCD drive and control device (SLCDCNT) 12. The MCU 5 is provided with a circuit unit comprising a central processing unit (CPU), a digital signal processor (DSP), and so forth. The MCU 5 can be made up so as to be separated into a baseband processor for carrying out baseband processing exclusive for use in communications, and an application processor for exclusively carrying out additional function controls such as display control, security control, and so forth. The LCDCNT 10, SLCDCNT 12, ASIC 6, and MCU 5 are made up of individual semiconductor devices, respectively, although the invention is not particularly limited thereto.

Figure 3:
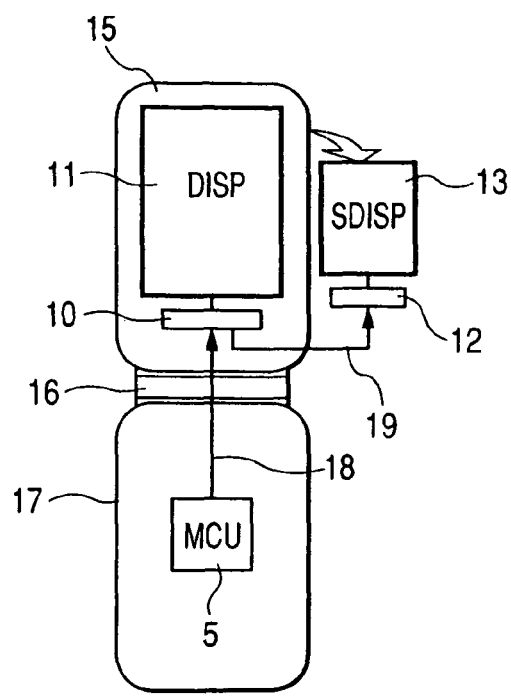
FIG. 3 is a schematic illustration showing transfer paths of display command, and display data, respectively, in the mobile telephone shown in FIG. 2.
Figure 4:
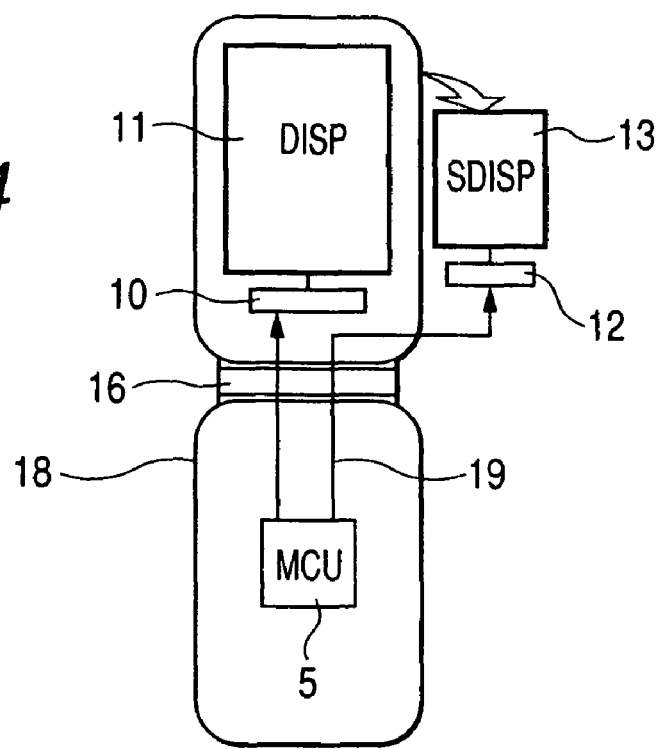
FIG. 4 is a block diagram of a mobile telephone according to a comparative example, showing an interfacing mode where a main liquid crystal display drive and control device, and a sub liquid crystal display drive and control device are connected to a host module via individual interfacing signal lines, respectively.
Figure 5:
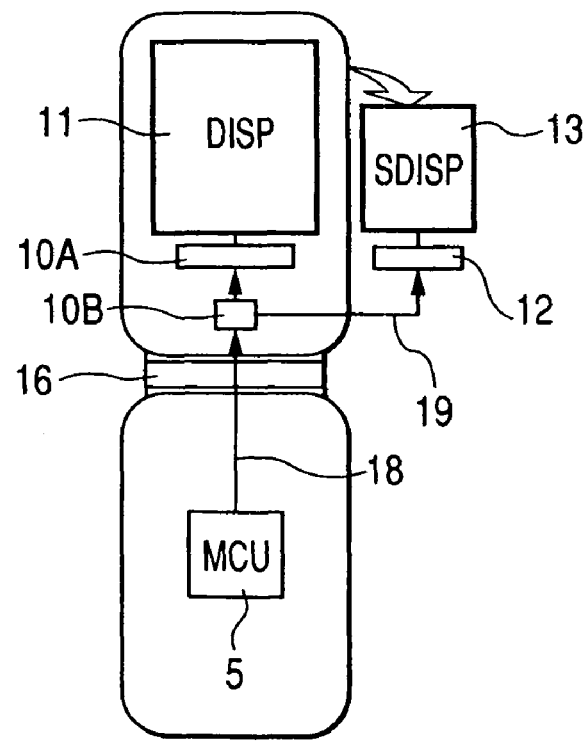
FIG. 5 is a block diagram of a mobile telephone according to another comparative example, where a main liquid crystal display drive and control device without a differential serial interfacing function is connected to a host module by parallel interfacing via a bridge circuit.

FIG. 3 shows transfer paths of the display command, and display data, respectively, in the mobile telephone shown in FIG. 2. In this case, the mobile telephone has a first case 15 and a second case 17 joined with the first case 15 in such a way as to be folded and unfolded through the intermediary of a hinge 16. The first case 15 comprises the LCD drive and control device 10, the sub LCD drive and control device 12, and the DISP 11, the sub SDISP 13, driven by the formers, respectively. In this connection, it is to be understood that the sub liquid crystal display drive and control device 12, and the sub liquid crystal display 13 are disposed on the back surface of the first case 15, in the figure. The second case 17 comprises the MCU 5 as the host module. There are provided a plurality of signal lines 18 interconnecting the LCD drive and control device 10 and the MCU 5. The plurality of signal lines 18 run through the hinge 16. Parts of the signal lines serve as differential signal lines through which information transmission is executed by high-speed serial interfacing. The sub liquid crystal display drive and control device 12 is connected to the LCD drive and control device 10 via a plurality of signal lines 19. The display command, and the display data are parallel-transferred to the sub-liquid crystal display drive and control device 12 via the plurality of signal lines 19. The high-speed serial interfacing low in amplitude can be executed by the LCD drive and control device 10, and the MCU 5 by making use of the differential signal lines. In this way, a necessary transfer rate can be obtained even with a fewer number of the signal lines in comparison with the bus signal lines 19 used for executing parallel interfacing. As a result, it is possible to reduce the number of the signal lines, so that the risk of the signal lines 18 being broken over time due to repeated folding and bending operations at the hinge 16 can be significantly reduced. Since the signal lines 19 do not run through the hinge 16, the display command, and the display data can be transferred through the signal lines 19 by means of parallel-transfer. If the signal lines 19 as well are drawn from the MCU 5 to run through the hinge 16 as with the case of a comparative example shown in FIG. 4, this will end up in increasing the risk of both the signal lines 18, 19 being broken at the hinge 16. With another comparative example shown in FIG. 5, there is adopted a liquid crystal display drive and control device 10A without a differential serial interfacing function using the signal lines 18, and instead, there is adopted a bridge circuit chip 10B having a function for bridging between a differential serial interface and a parallel interface. In this case, not only the bridge circuit chip 10B, that is, one additional constituent, is required, but also the bridge circuit chip 10B has to perform a function of distributing signals to not only the liquid crystal display drive and control device 10A, but also the sub liquid crystal display drive and control device 12, and so forth, so that control will get complicated, thereby raising the risk of operability undergoing deterioration.

Figure 1:
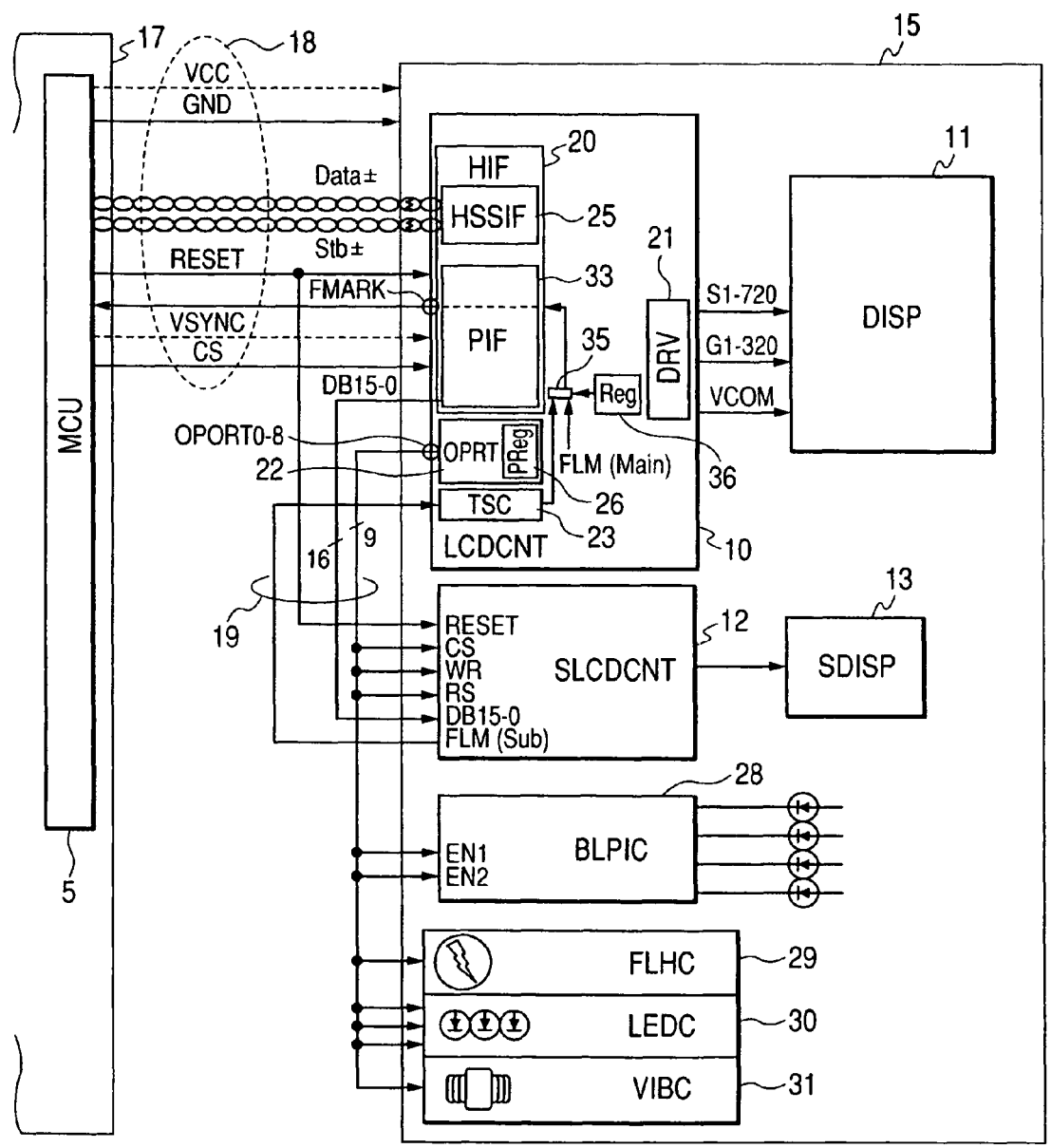
FIG. 1 is a block diagram showing a detailed configuration of an interface of a mobile telephone adopting a liquid crystal display drive and control device connected to a host module using a high-speed serial interface by way of an example.

FIG. 1 is a block diagram showing a detailed circuit configuration of the case 15 of the mobile telephone shown in FIG. 3 by way of an example. The LCD drive and control device 10 comprises a host interface circuit (HIF) 20, a drive circuit (DRV) 21, an output port (OPRT) 22, and an input circuit (TSC) 23. The host interface circuit 20 can be used for connection with the MCU 5 as the host module. The drive circuit 21 generates a drive signal for driving the liquid crystal display 11 on the basis of information inputted to the host interface circuit 20 before outputting.

The host interface circuit 20 comprises a high-speed serial interface circuit (HSSIF) 25 serving as a first serial interface circuit for executing serial interfacing by use of the differential signal lines. Signal interconnections for the high-speed serial interfacing include two lengths of differential data lines Data ±, and two lengths of differential strobe signal lines Stb ±. In this case, there is no particular limitation to Transfer Protocols for the high-speed serial interfacing, however, for example, on a transmitter side, data is sent out to the differential data lines Data ± in synchronization with variation in edges of respective clock signals on the differential strobe signal lines Stb ±, and on a receiver side, data units on the differential data lines data ± are fetched for every determined time period of the respective clock signals on the differential strobe signal lines Stb ±. Determination on signals "1", "0" may be made according to differential directions of current. A transfer rate is as high as, for example, from 100 to 400 Mbps, and a signal amplitude is as low as, for example, 300 mV.

The output port 22 is capable of controlling a logic level of an output signal on the basis of the information inputted to the host interface circuit 20. For example, the output port 22 has a plurality of port terminals OPORTO-8, and port registers (PReg) 26, and control data for deciding an output logic value of each of the port terminals OPORTO-8 is set in the respective port registers 26. The control data is fed from the MCU 5 via the high-speed serial interface circuit 25.

For example, a backlight control device (BLPIC) 28, a flashlight control device (FLHC) 29, an LED control device (LEDC) 30, a vibrator control device (VIBC) 31, and the sub LCD drive and control device (SLCDCNT) 12 are connected to the port terminals OPORTO-8, respectively. The backlight control device (BLPIC) 28 controls lighting of the backlight for the DISP 11, and the sub SDISP 13, respectively, and receives a lighting-enable signal for that purpose from the output port 22. The flashlight control device (FLHC) 29 controls flashing of a camera, receiving a flashing-activation signal for that purpose from the output port 22. The LED control device (LEDC) 30 drives lighting of an LED for illumination, receiving a lighting-control signal for that purpose from the output port 22. The vibrator control device (VIBC) 31 controls driving of a vibrator for notifying signal-receive by means of vibration, receiving an activation-control signal for that purpose from the output port 22. The sub LCD drive and control device 12 executes drive/control of display for the sub SDISP 13. Strobe signals such as a chip-select signal (a select signal for the sub LCD drive and control device 12) CS, a light signal (an external signal to instruct a lighting-operation) WR, and a register select signal (a signal to indicate a register as a target for a lighting-operation) RS are fed from the output port 22 to the sub LCD drive and control device 12, respectively.

Thus, it is possible for the output port 22 of the LCD drive and control device 10 to perform the function of distributing signals to circuits subjected to control by level signals with determined logic levels, respectively, such as strobe control of the sub LCD drive and control device 12, control of peripheral devices including LEDs for camera flashlight, and illumination display. Accordingly, although the backlight control device 28, flashlight control device 29, LED control device 30, vibrator control device 31, or the sub LCD drive and control device 12 is incorporated in the first case 15, the output port 22 of the LCD drive and control device 10 performs the function of distributing the signals from the MCU among those devices, and there is therefore no need to install exclusive signal lines for feeding the signals from the MCU 5 to those devices, respectively. There will be no increase in the number of the signal lines running through the hinge 16.

The host interface circuit 20 further comprises a parallel interface circuit (PIF) 33. When the high-speed serial interface circuit 25 receives a command and display data from the MCU 5, the host interface circuit 20 is enabled to feed the command and the display data to the drive circuit 21 if the same are for use in display on the DISP 11 while the host interface circuit 20 is enabled to feed the command and the display data from the parallel interface circuit (PIF) 33 to the sub LCD drive and control device 12 via a parallel signal line DB 15-0 of 16 bits if the same are for use in display on the sub SDISP 13. With the sub LCD drive and control device 12 mounted in the first case 15, the LCD drive and control device 10 comes to be capable of performing not only outputting of the strobe signals CS, WR, and RS from the output port 22, but also outputting of the command and the display data from the parallel interface circuit 33. Hence, there is no increase in the number of the signal lines 18 even in the case of the sub LCD drive and control device 12 and the sub SDISP 11 being mounted in the first case 15.

The host interface circuit 20 comprises a frame-synchronizing signal output terminal FMARK capable of outputting a frame-synchronizing signal for instructing timing for fetching the display data through frame synchronization. For example, the frame-synchronizing signal is a signal generated based on a signal FLM (main) indicating the head of a display frame, undergoing a change in pulse at a position indicating the head of the display frame. The signal FLM (main) is an internal control signal undergoing a change in synchronization with the head of the display frame when the display frame is written to a frame buffer 43, and is generated in a timing control circuit (corresponding to a timing generator 50 in FIG. 7) for controlling display timing. The LCD drive and control device 10 feeds the MCU 5 with the frame-synchronizing signal, whereupon the MCU 5 becomes capable of feeding the display data, and so forth to the LCD drive and control device 10, in synchronization with the frame-synchronizing signal.

The input circuit 23 is a circuit for enabling the sub LCD drive and control device 12 as well to fetch the display data in synchronization with the head of the display frame. That is, a signal FLM (sub) outputted by the sub LCD drive and control device 12 is inputted thereto, thereby enabling the signal FLM (sub) to be outputted from the terminal FMARK. More specifically, in the case where the host interface circuit 20 outputs the display data, and so forth, received via the high-speed serial interface circuit 25, for use in display control by the sub LCD drive and control device 12, from the parallel interface circuit 33 to the sub LCD drive and control device 12, the signal FLM (sub) outputted from the sub LCD drive and control device 12 is inputted to the input circuit 23, and the signal FLM (sub) as inputted is selected by a selector 35 in place of the signal FLM (main) generated inside the LCD drive and control device 10 to be then outputted from the terminal FMARK to the MCU 5. It need only be sufficient to control the selector 35 according to control data set in a register 36. As a result, even when the LCD drive and control device 10 feeds the display data from the parallel interface circuit 33 to the LCD drive and control device for sub-display 12, it becomes possible for the sub LCD drive and control device 12 to fetch the display data in synchronization with the header of the display frame.

In addition, a reset signal line RESET, a vertical synchronizing signal line VSYNC, a control signal line CS, a power supply line VCC, and a ground power line GND are included in the signal lines 18. The reset signal line RESET is utilized for initialization of the LCD drive and control device 10, and the sub LCD drive and control device 12, respectively. The vertical synchronizing signal line VSYNC is utilized for synchronizing display control of moving pictures as represented in the case of a video telephone, and so forth. A control signal CS is utilized as an interrupt signal used for releasing a sleep state of the sub LCD drive and control device 12. In the case of FIG. 1, the control signal CS is unrelated in function to the chip-select signal CS as previously described.

Figure 6:
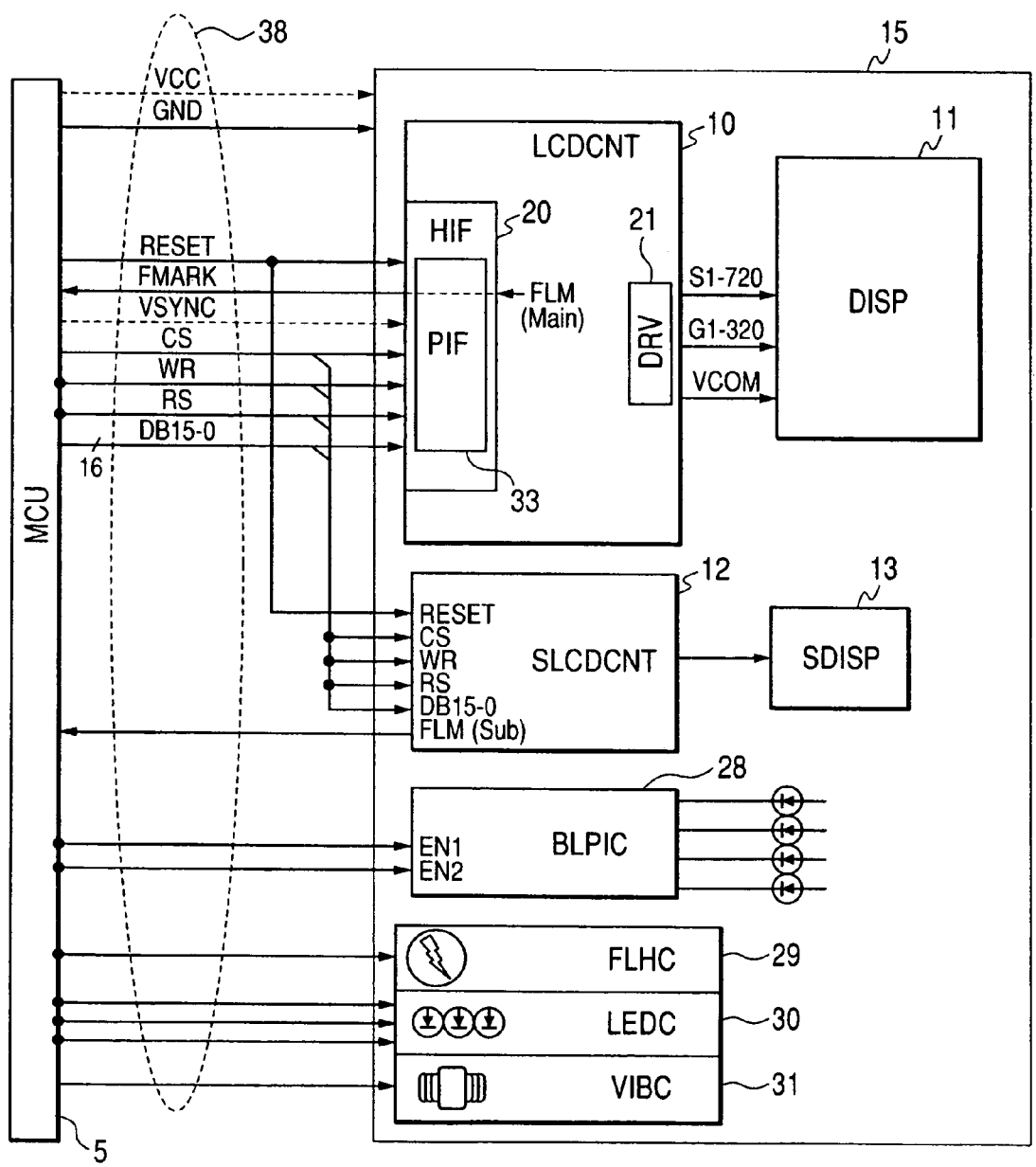
FIG. 6 is a block diagram showing an example of a host interface configuration in the case of adopting a parallel interface by use of a different selectable function from that shown in FIG. 1.

FIG. 6 is a block diagram showing an example of a host interface configuration in the case of selecting a parallel interface as a function of the host interface of the LCD drive and control device 10. A host interface circuit 20 of the host interface function of the LCD drive and control device 10 is provided with functions of selecting a high-speed serial interface as the host interface function, and selecting a parallel interface as the host interface function although the invention is not particularly limited thereto. Which of those functions to be selected is dependent on level setting of a mode terminal (IM 3-0 in FIG. 7).

In the case of selecting the parallel interface function, host interfacing with a MCU 5 is mainly executed through a parallel interface circuit 33. No use is made of the high-speed serial interface function. Parallel interfacing with the MCU 5 is executed via RESET, FMARK, VSYNC, CS, WR, RS, and DB15-0. In the case of selecting the parallel interfacing with the MCU 5, the LCD drive and control device 10 as well inputs CS, WR, and RS, inputting a command and display data via DB 15-0. Connection between the sub liquid crystal display drive and control device 12, and the MCU 5 is made by utilizing those signal lines for the parallel interfacing. A signal FLM (sub) from the sub LCD drive and control device 12 is directly fed to the MCU 5. Controls of BLPIC 28, FLHC 29, LEDC 30, and VIBC 31, respectively, are executed via exclusive signal lines directly connected to respective output ports of the MCU 5.

In the case of adopting the parallel interface as the host interface function instead of the high-speed serial interface, the number of the signal lines 38 necessary for the host interfacing will increase to several tens of lengths. The case of adopting an interface configuration shown in FIG. 6 in reality is the case where the MCU 5 is not in support of the function of interfacing with the high-speed serial interface circuit 25.

In this case, it is naturally impossible to obtain an advantageous effect of reducing the number of interconnections running through the hinge 16 as shown in FIG. 1.

[Liquid Crystal Display (LCD) Drive and Control Device]

Figure 7:
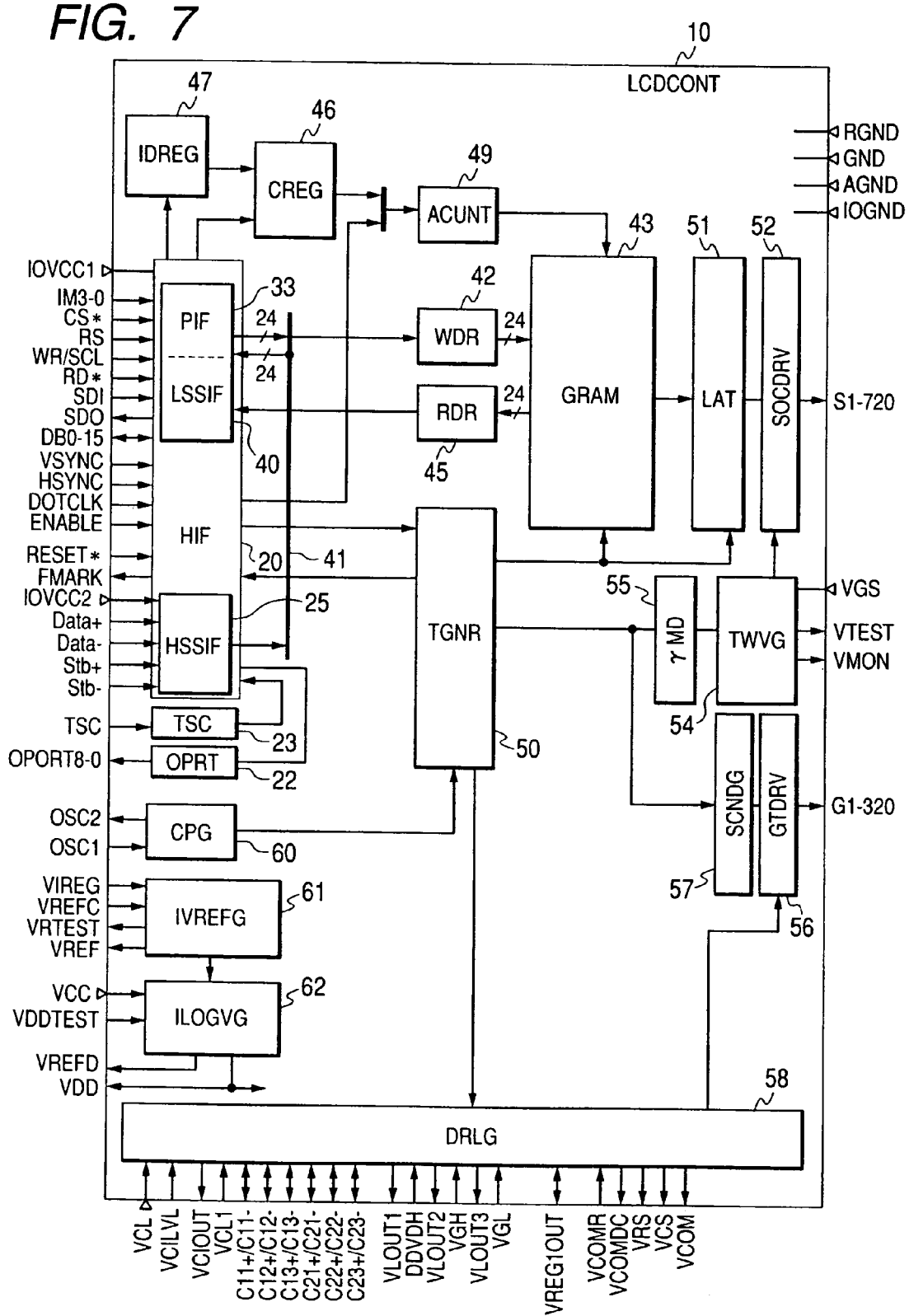
FIG. 7 is a block diagram showing the detailed configuration of the liquid crystal display drive and control device by way of example.

FIG. 7 is a block diagram showing the detailed configuration of the LCD drive and control device 10 by way of example. The host interface circuit 20 comprises a low-speed serial interface circuit (LSSIF) 40 as a second serial interface circuit besides the parallel interface circuit 33, and the high-speed serial interface circuit 25. The low-speed serial interface circuit 40 executes serial input/output of data by use of a serial input terminal SDI, and a serial output terminal SDO, respectively. The respective amplitudes of signals at the terminals SDI, SDO, respectively, are as high as approximately 1.5 V, and transfer rates of the signals are low. The parallel interface circuit 33, the high-speed serial interface circuit 25, or the low-speed serial interface circuit 40 can be used for input/output of a command as well as display data between MCU5 representing the host module, and the host interface circuit 20. Which of those circuits is to be used is determined depending on whether the mode terminal IM3-0 is in a pull-up state or pull-down state. If the high-speed serial interfacing is selected, such an interfacing mode as shown in FIG. 1 can be implemented. If the parallel interfacing is selected, such an interfacing mode as shown in FIG. 6 can be implemented. Further, if low-speed serial interfacing is selected, it is possible to implement an interfacing mode where the low-speed serial interface is substituted for the parallel interface in the interfacing mode shown in FIG. 6. Thus, with the LCD drive and control device 10, it is possible to ensure flexibility of a system configuration in respect of selectability of the interfacing mode with a host system.

The host module transmits a command and display data to the host interface circuit 20 by making use of a packet in a predetermined format. In the case of adopting the high-speed serial interface for the host interface, the command and the display data are received from differential data terminals Data ±. In the case of adopting the parallel interface for the host interface, the command and the display data are received from a data input/output terminal DBO-15. In the case of adopting the low-speed serial interface for the host interface, the command and the display data are received from a serial data input terminal SDI.

Upon receiving a command packet from the host module, the host interface circuit 20 stores address information as received through the packet in an index register (IDREG) 47. The index register 47 decodes a command address as stored, and generates a register select signal, and so forth. Command data received through the packet is fed to a command data register array (CDREG) 46. The command data register array 46 comprises a multitude of command data registers subjected to mapping at predetermined addresses, respectively. The command data register where the command as received is to be stored is selected by the register select signal outputted by the index register 47. The command data latched by the command data register is fed to a corresponding part of the circuits, as an instruction or a control data, thereby controlling an internal operation. Further, it is also possible to directly select a command data register in the command data register array 46 to thereby set the command data in the command data register as selected.

Upon receiving a data packet from the host module, the host interface circuit 20 feeds address information of the data packet to an address counter (ACUNT) 49. The address counter (ACUNT) 49 executes an incremental operation, and so forth, according to the content of the command data register corresponding to the address information to thereby execute addressing against a display memory (GRAM) 43. If an access directive according to the command data at this point in time is to execute a write-operation against the display memory 43, data of the data packet is fed to a write-data register (WDR) 42 via a bus 41 to be then stored in the display memory (GRAM) 43 at the same timing. Storage of the display data is executed, for example, on a display frame-by-display frame basis. If an access directive according to the command data is to execute a read-operation against the display memory 43, data stored in the display memory 43 is read by a read-data register (RDR) 45 to be then rendered feedable to the host module. When the command data register receives the display data, the display memory 43 executes the read-operation in synchronization with display timing. A timing generator (TGNR) 50 executes timing control for reading and displaying. The display data read from the display memory 43, in synchronization with the display timing, is latched by a latch circuit (LAT) 51. The data as latched is given to a source driver (SOCDRV) 52. The DISP 11 as a target for drive/control by the LCD drive and control device 10 is made up of a dot matrix TFT (thin-film transistor) liquid crystal panel, comprising drive terminals such as a multitude of source electrodes as signal electrodes, and a multitude of gate electrodes as scanning electrodes. The source driver (SOCDRV) 52 drives the source electrodes of the DISP 11 via a drive terminal S1-720. A drive level of the drive terminal S1-720 is controlled by use of a gradation voltage generated by a gradation voltage generation circuit (TWVG) 54. The gradation voltage can be subjected to gamma correction by a gamma correction circuit (γ MD) 55. A scan data generation circuit (SCNDG) 57 generates scanning data in synchronization with scanning timing given from the timing generator (TGNR) 50. The scanning data is fed to a gate driver (GTDRV) 56. The gate driver 56 drives the gate electrodes of the DISP 11 via a drive terminal G1-320. A drive level of the drive terminal G1-320 is controlled by use of a drive voltage generated by a liquid-crystal drive-level generation circuit (DRLG) 58.

A clock pulse generator (CPG) 60 generates an internal clock by receiving source oscillation clocks from terminals OSC1, OSC2, respectively, to thereby feed the internal clock as an operation timing reference clock to the timing generator 50. An internal reference voltage generation circuit (IVREFG) 61 generates a reference voltage to be fed to an internal logic power supply regulator (ILOGVG) 62. The internal logic power supply regulator 62 generates an internal logic power supply on the basis of the reference voltage.

[Packet Control]

Figure 8:
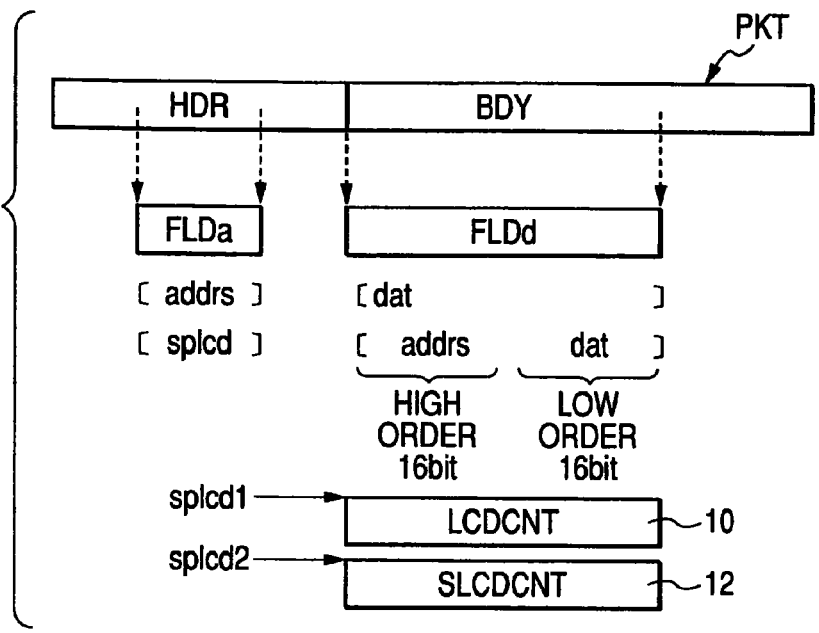
FIG. 8 is a schematic illustration showing a packet for use in transmitting information from a MCU to the liquid crystal display drive and control device.

In FIG. 1, the MCU 5 transmits information to the LCD drive and control device 10 by making use of the packet in the predetermined format. The packet PKT includes a header part (HDR), and a body part (BDY), as shown in FIG. 8 by way of example. The header part (HDR) has a packet data word-length region, an identification information region indicating the type of the packet, a parity code region, an address region FLDa, and so forth. The body part (BDY) has a data region FLDd.

The address region FLDa of the header part can include address information addrs, or specific code information splcd. The address information addrs means information on respective addresses assigned to address spaces inside the LCD drive and control device 10, and the sub LCD drive and control device 12, respectively. For example, in the case of the LCD drive and control device 10, those addresses include the respective addresses of the command data registers of the command data register array 46, register addresses of the index register 47, respective addresses of the port registers 26 of the output port 22, addresses of the register 36, addresses of the display memory 43, and so forth. In the case of the sub LCD drive and control device 12 as well, those addresses similarly include the respective addresses of the command data registers, the addresses of the display memory, and so forth. The specific code information splcd includes code information splcd 1 that can be assumed to specify the LCD drive and control device 10, and code information splcd 2 that can be assumed to specify the sub LCD drive and control device 12. In practice, information on a blank address not subjected to mapping as the address information, or information on an address having no possibility of being put to use can be assigned to the specific code information.

When the address information addrs is stored in the address region FLDa, the data region FLDd of the body part (BDY) has data dat corresponding to the address information addrs. On the other hand, when the specific code information splcd is stored in the address region FLDa, the data region FLDd of the body part (BDY) can include the data dat corresponding to the address information addrs. For example, if a piece of data of the body part is 32 bits in length, high order 16 bits represent a storage region for the address information addrs while lower order 16 bits represent a storage region for the data dat, or command dat. The address information addrs is, for example, command address information, and the data dat corresponding thereto is a command.

Upon detection of the specific code information splcd out of the packet as received, the LCD drive and control device 10 causes the data dat to be held at an address specified by the address information addrs of the body part (BDY) if the specific code information splcd is splcd 1 corresponding to the LCD drive and control device 10. If the specific code information splcd is splcd 2 corresponding to the sub LCD drive and control device 12, the LCD drive and control device 10 transfers the information of the body part (BDY) to the sub LCD drive and control device 12 via the signal line 19 to thereby cause the data dat to be held at an address in the sub LCD drive and control device 12, specified by the address information addrs. If the LCD drive and control device 10 is unable to detect the specific code information splcd out of the packet as received, the LCD drive and control device 10 causes information of the data region FLDd to be held at an address specified by the address information addrs of the address region FLDa. In short, the information of the address region FLDa of the header part HDR is used as the address information for the data dat of the body part BDY. When the information of the address region FLDa of the header part HDR is a part of mapping address of the sub LCD drive and control device 12, the LCD drive and control device 10 transfers the address information addrs, and the information dat of the data region FLDd to the sub LCD drive and control device 12 via the signal line 19.

Figure 9:
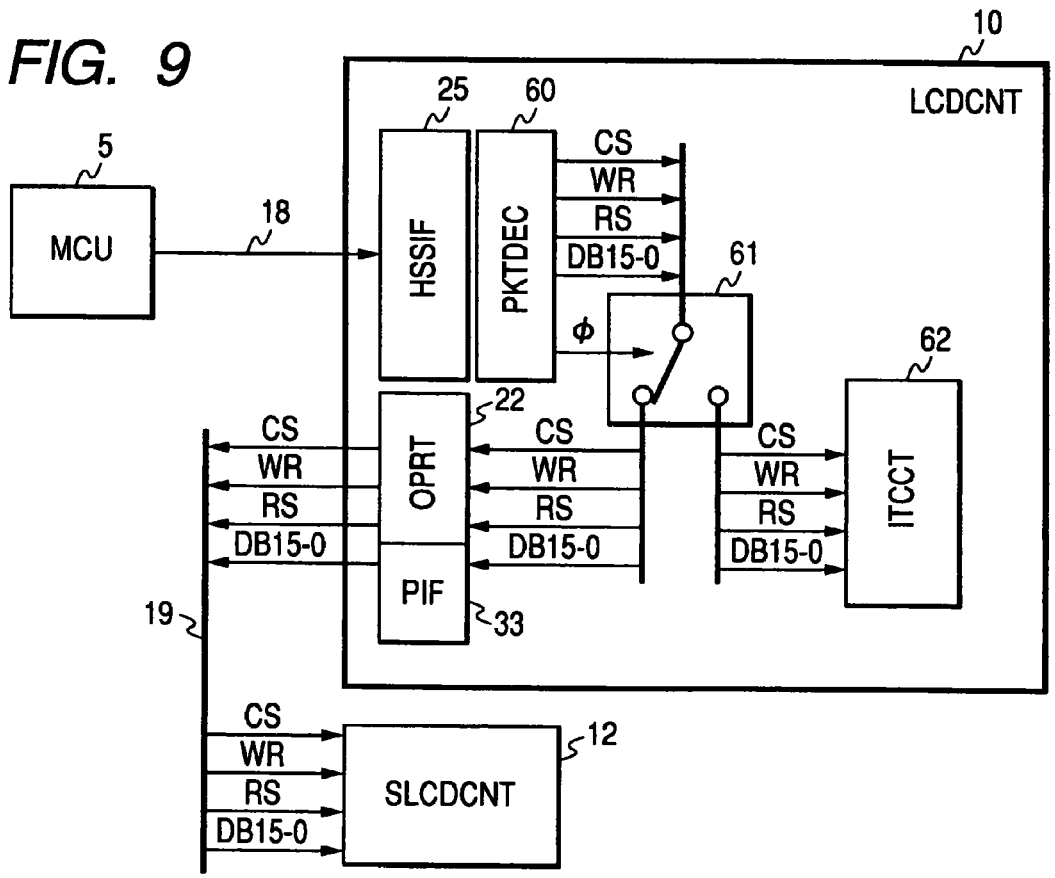
FIG. 9 is a block diagram showing a circuit configuration for executing control on whether or not data of the packet is transferred to the sub liquid crystal display drive and control device by way of example.

Control on whether or not the data of the packet is transferred to the sub LCD drive and control device 12 can be executed by decoding the header part HDR by use of a packet decoder (PKTDEC) 60, as shown in FIG. 9, to thereby change over a switch 61 based on a control signal $\phi$ obtained as the result of decoding. A circuit block denoted by reference numeral 62 refers to an internal circuit (ITCCT), which is a generic term for a circuit unit for executing control of display for the DISP 11.

Packets that do not have the specific code information splcd in the header part HDR include a single access packet, and a multi-access packet. When the LCD drive and control device 10 receives the single access packet, the LCD drive and control device 10 causes the information dat of the data region FLDd to be held at an address directly specified by the address information addrs of the address region FLDa. When the LCD drive and control device 10 receives the multi-access packet, the LCD drive and control device 10 executes sequential increments with the address directly specified by the address information addrs of the address region FLDa, used as a base point, to thereby cause respective pieces of the information dat of a plurality of succeeding data regions FLDd to be sequentially held at respective addresses as incremented. Differentiation between the single access packet, and the multi-access packet can be implemented on the basis of a code of the identification information region of the header part although the invention is not particularly limited thereto.

Figure 10:
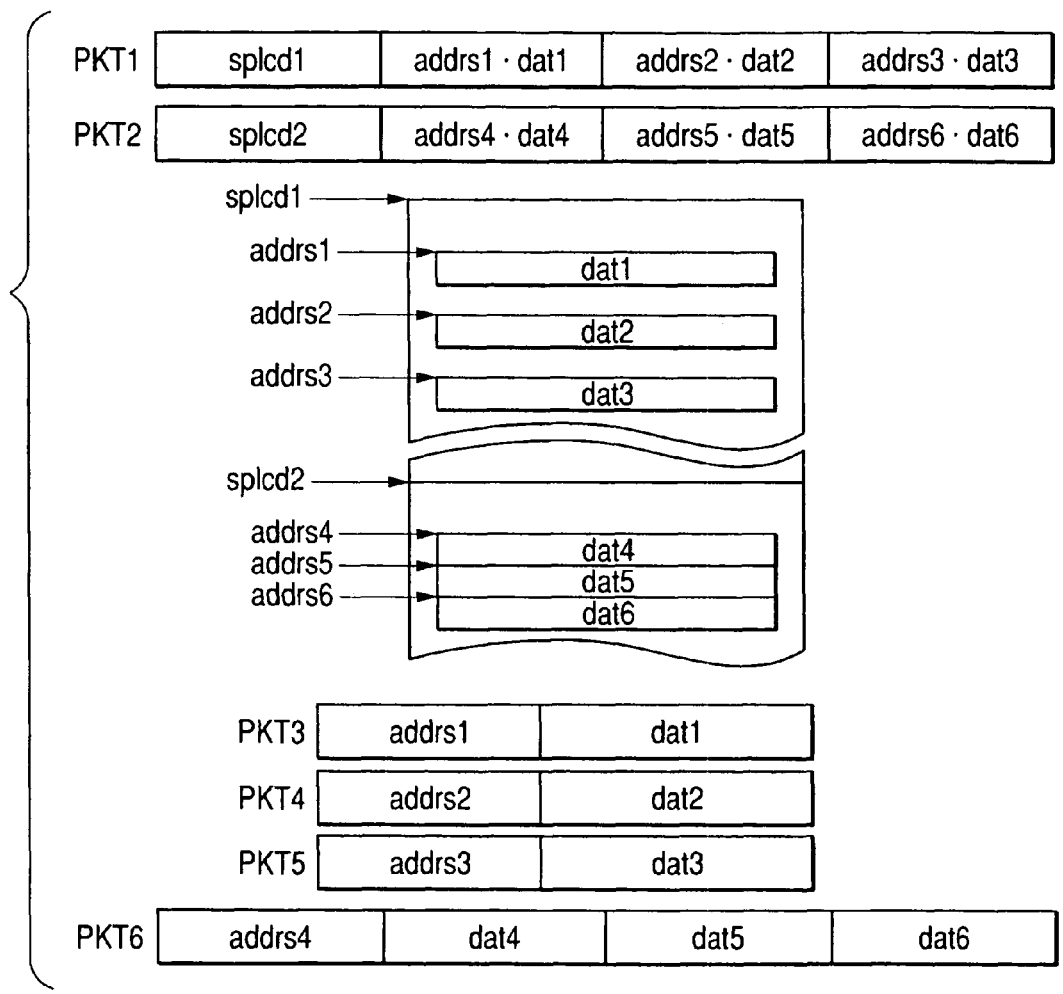
FIG. 10 is a schematic illustration showing several types of packet configurations including a packet where addresses as specified by address information addrs 1, addrs 2, and addrs 3, respectively, are nonlinear, and a packet where addresses as specified by respective pieces of address information are linear by way of example.

In the case of an example shown in FIG. 10, addresses in a packet PKT 1, as specified by address information addrs 1, addrs 2, and addrs 3, respectively, are nonlinear, and addresses in a packet PKT 2, as specified by address information addrs 4, addrs 5, and addrs 6, respectively, are linear. In a PKT format where the address information addrs and the data dat, in pairs, are specified in the data region FLDd, as with the packets PKT 1, PKT 2, it is possible to store data at specified locations of one packet by multi-random access regardless of whether the addresses as specified are linear or nonlinear. In contrast, in a PKT format where the address information addrs is specified in the address region FLDa, and the data corresponding to the address information addrs is included in the data region FLD, as with packets PKT 3 to PKT 6, it is possible to store the data at the specified locations with a multi-access packet such as PKT 6 in the case of linear addresses, however, in the case of nonlinear addresses, single access packets such as packets PKT 3 to PKT 5 need be individually issued.

Figure 11:
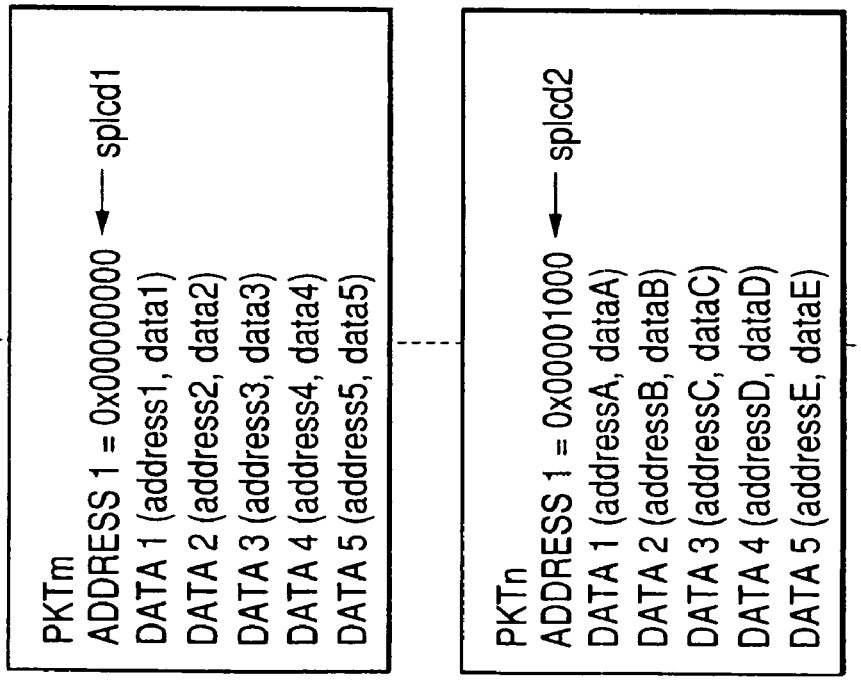
FIG. 11 is a schematic illustration showing an example of a packet in the case of executing command-transfers for the sub drive and control device, and the liquid crystal display drive and control device, respectively, using a packet format where the address information and the data, in pairs, are specified in data region.
Figure 12:
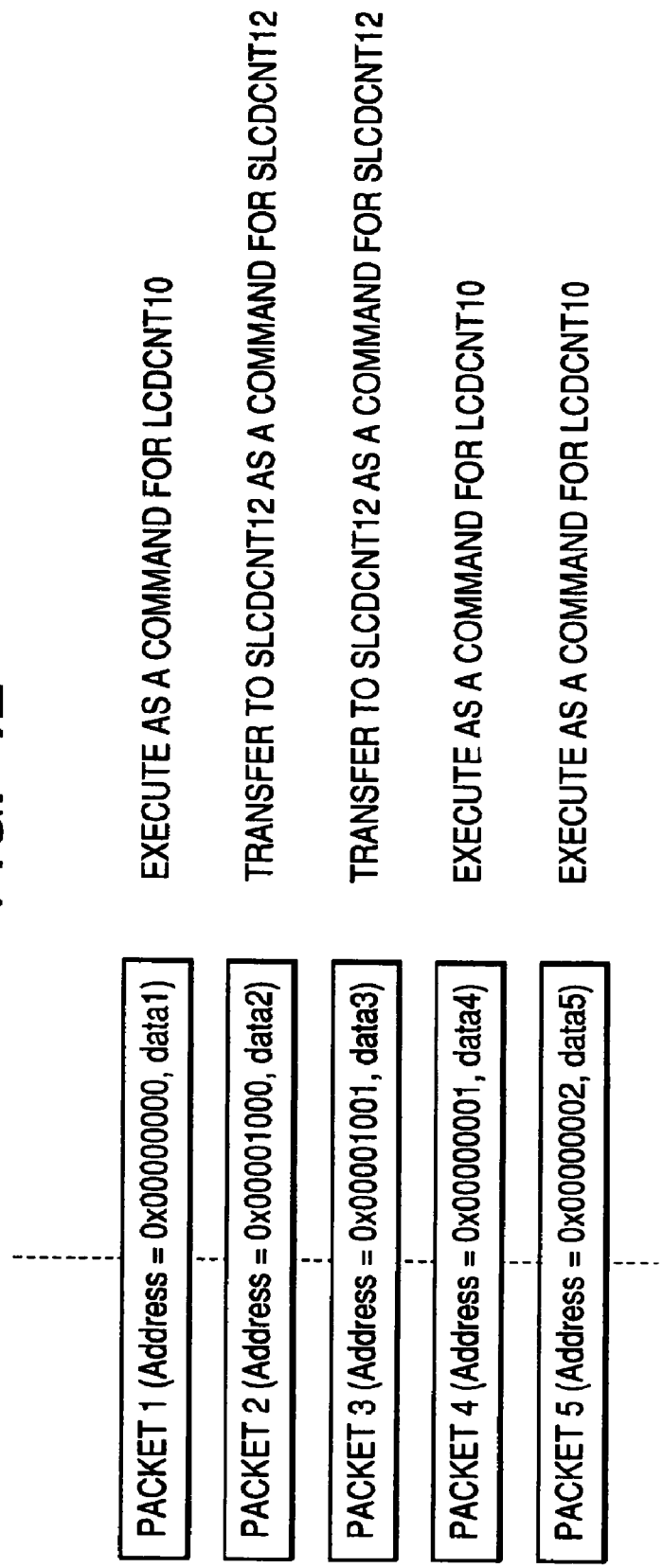
FIG. 12 is a schematic illustration showing an example of packet addressing where a multitude of packets need be generated in the case of using a command format where the address information is specified in an address region.

In FIG. 11, there is shown an example of a packet in the case of executing command-transfers for the sub LCD drive and control device 12, and the LCD drive and control device 10, respectively, using the packet format where the address information addrs and the data dat, in pairs, are specified in the data region FLDd. A packet PKTm is a packet for the LCD drive and control device 10. A packet PKTn is a packet for the sub LCD drive and control device 12. In the case of using a command format where the address information is specified in the address region FLDa, this will result in the necessity for generating a multitude of packets depending on a method of packet addressing, as shown in FIG. 12 by way of example.

Figure 13:
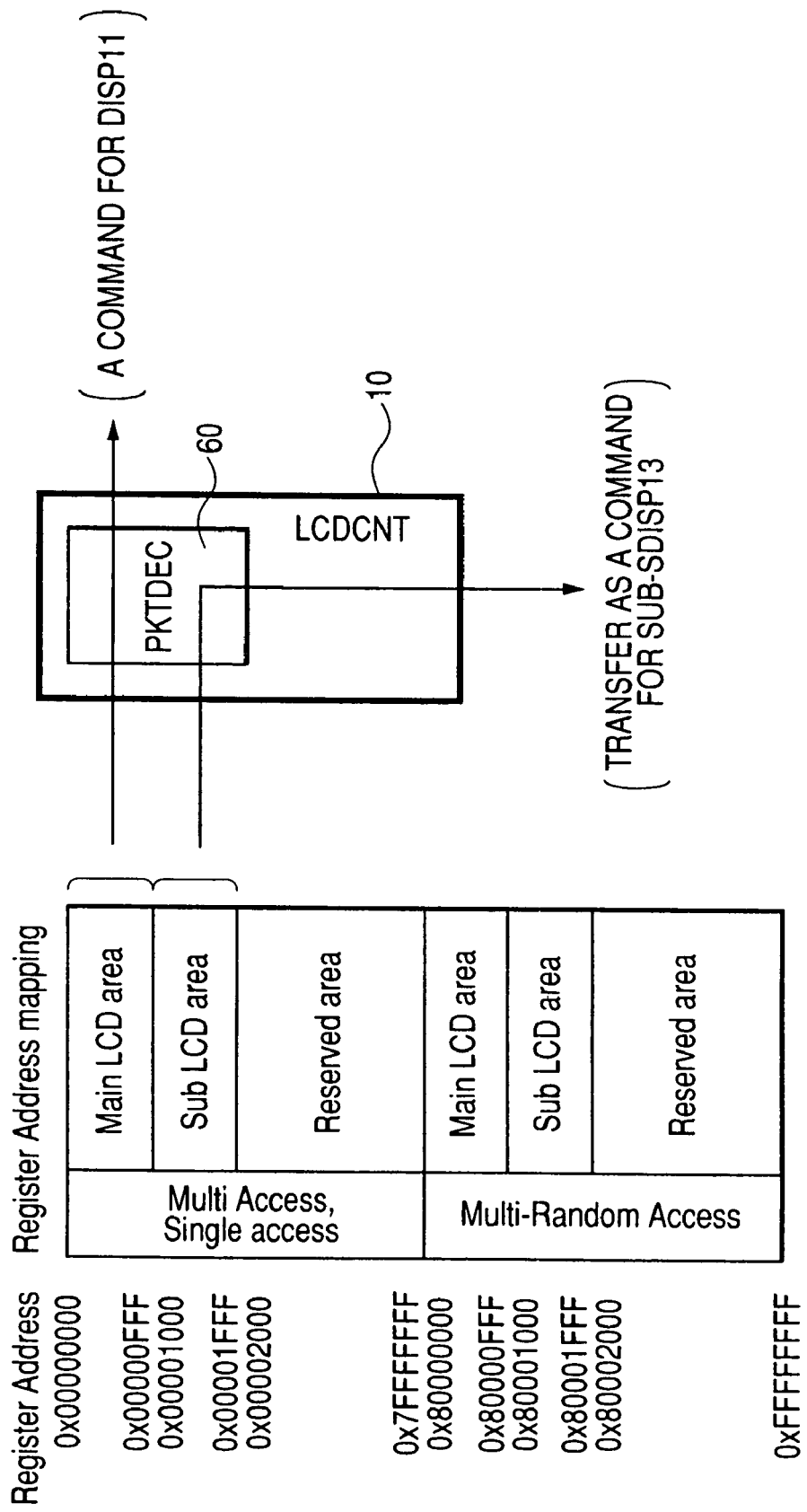
FIG. 13 is an address map showing an example of address mapping for the sub liquid crystal display drive and control device, and the liquid crystal display drive and control device, respectively.

In FIG. 13, there is shown an example of address mapping for the sub LCD drive and control device 12, and the LCD drive and control device 10, respectively. The display memory, command registers, and various control registers thereof are shown after mapping at respective addresses as appropriate. A first space from 0×00000000 to 0×7FFFFFFF is defined as an optimum space for the single access, or the multi-access, and a second space from 0×80000000 to 0×FFFFFFFF is defined as an optimum space for the multi-random access although the invention is not particularly limited thereto. A space (Main LCD Area) for the LCD drive and control device 10, and a space (Sub LCD Area) for the sub LCD drive and control device 12 are assigned to the first space, and the second space, respectively. In the first space, memory addresses, and so forth are subjected to linear mapping inside the Main LCD Area, and the Sub LCD Area, respectively. In second space, register addresses, and so forth are subjected to nonlinear mapping inside the Main LCD Area, and the Sub LCD Area, respectively. Accordingly, for a packet for use in setting a command and data in the registers, and so forth, in the second space, it is advisable to adopt the packet format where the address information addrs and the data dat, in pairs, are specified in the data region FLDd, as represented by the packets PKT 1, PKT 2, shown in FIG. 10.

Even if such a packet as described is used in the first space, this will result in no inconvenience, however, if a packet of the format where the address information addrs is set in the address region FLDa is used in the second space, this will cause inconvenience.

Since the data region FLDd of the body part BDY contains the data dat corresponding to the address information addrs, even if assignment of addresses holding data or decoding information of the data is not linear, but is out of order, the data or the decoding information thereof can be latched by the registers or the memory with one packet. It need only be sufficient to prestore the address information addrs and the data dat corresponding thereto, in pairs, in a memory, such as a ROM, and so forth, inside the MCU 5, so as to be used by reading the same out of the ROM as necessary. In this case, capturing of addresses in the ROM by the MCU 5 will suffice for generation of packets, so that it is possible to do away with capturing addresses that are not in order by the LCD drive and control device 10, and the sub LCD drive and control device 12, respectively, to thereby make setting of the address region FLDa of the header part HDR. Thus, it becomes possible to facilitate an operation for setting the command, image data, and so forth in the LCD drive and control device 10, and the sub LCD drive and control device 12, respectively.

Since it is possible to specify the LCD drive and control device 10, and the sub LCD drive and control device 12 that are to receive the data dat of the body part BDY, respectively, on the basis of the specific code information splcd contained in the address region FLDa of the header part HDR, it also becomes possible to control addresses of regions holding the command data, or decoding information of the command data, and so forth for every local address region by the LCD drive and control device 10, and the sub LCD drive and control device 12, respectively. Accordingly, even if a different peripheral circuit other than the sub LCD drive and control device 12 is additionally installed, an operation for setting the command data, and so forth in the peripheral circuit will not be complicated.

Having specifically described the invention developed by the inventors on the basis of embodiments of the invention, it is to be understood that the invention be not limited thereto, and that various changes and modifications may be naturally made in the invention without departing from the spirit and scope of the invention.

For example, the command in the present specification means not only an instruction as set in the command data registers, but also control data to be set in the control register such as a port control register. In short, with the LCD drive and control device, data other than the display data refers to the command, meaning instruction data giving an instruction for an operation in a broad sense. It is not essential to the present invention that either of application forms shown in FIGS. 1 and 6, respectively, is selectable by mode setting with one unit of the LCD drive and control device. For example, the high-speed serial interfacing via the signal lines 18, or parallel-transfer of data to the peripheral device via the signal lines 19 may be adopted. The host module is not limited to one unit of the MCU 5 for use in the baseband processing and application processing. The host module may be both the baseband processor, and the application processor, including another circuit. Application of the present invention is not limited to the mobile telephone and the present invention is widely applicable to a mobile data processing terminal such as PDA (personal digital assistant), and a variety of redundant terminal systems such as a storage terminal, and so forth.

What is claimed is:

1. A liquid crystal display drive and control device adapted for use with a host device, a liquid crystal display panel, and a sub liquid crystal display drive and control device for a sub liquid crystal display panel, the liquid crystal display drive and control device comprising:
   a first serial interface circuit interface in a host interface circuit adapted for direct connection with the host device;
   a drive circuit which generates a drive signal for driving the liquid crystal display panel on the basis of information input to the host interface circuit;
   an output port directly coupled to the sub liquid crystal display drive and control device to control the sub liquid crystal display drive and control device for the sub liquid crystal display panel on the basis of the information input to the first serial interface circuit; and
   a parallel interface directly coupled to the sub liquid crystal display drive and control device for the sub liquid crystal display panel, to send data or commands.

2. A liquid crystal display drive and control device according to claim 1,
   wherein the output port comprises a plurality of port terminals coupled to the sub liquid crystal display drive and control device, and port registers, and
   wherein data for deciding an output logic value of each of the port terminals to the sub liquid crystal display drive and control device for the sub liquid crystal display panel is set in the respective port registers.

3. A liquid crystal display drive and control device according to claim 2, further comprising:
   a display memory for storing display data,
   wherein the drive circuit generates a gate drive signal and a source drive signal for driving the liquid crystal display panel according to the display data stored in the display memory.

4. A liquid crystal display drive and control device according to claim 3,
   wherein the first serial interface circuit is adapted to interface with the host device, and
   wherein the first serial interface circuit comprises differential terminals for input of serial data.

5. A liquid crystal display drive and control device according to claim 4,
   wherein the host interface circuit further comprises:
   a plurality of mode terminals for receiving mode determination signals for determining which of the first serial interface circuit and the parallel interface circuit is to be used as an interface with the host device.

6. A liquid crystal display drive and control device according to claim 5,
   wherein in an operation mode which uses the first serial interface circuit as an interface with the host device, the host interface circuit enables information received by the first serial interface circuit to be output to the drive circuit, and to be output from the parallel interface circuit to the sub liquid crystal display drive and control device.

7. A liquid crystal display drive and control device according to claim 6,
   wherein in the operation mode which uses the first serial interface circuit as the interface with the host device, the host interface circuit outputs strobe signals from the parallel interface circuit to the sub liquid crystal display drive and control device necessary for parallel interfacing between the liquid crystal display drive and control device and the liquid crystal display drive and control device when outputting the information received by the first serial interface circuit.

8. A liquid crystal display drive and control device according to claim 7,
wherein the host interface circuit comprises a frame-synchronizing signal output terminal configured to output a frame-synchronizing signal for instructing timing for fetching the display data through frame synchronization, and
wherein in the operation mode which uses the first serial interface circuit as the interface with the host device, the host interface circuit enables the frame-synchronizing signal input from the sub liquid crystal display drive and control device to be to the host device when image information received by the first serial interface circuit can be output from the parallel interface circuit to the sub liquid crystal display drive and control device.

9. A liquid crystal display drive and control device comprising:
a host interface circuit adapted for connection with a host device; and
a drive circuit which generates a drive signal for driving a liquid crystal display panel on the basis of information input to the host interface circuit,
wherein the host interface circuit comprises
a first serial interface circuit adapted to be directly coupled with the host device;
a second serial interface circuit having a different communication speed from the first serial interface circuit; and
a parallel interface circuit directly coupled to a sub liquid crystal display drive and control device for a sub liquid crystal display to send data or commands,
wherein the first serial interface circuit comprises differential terminals for input of serial data, and
wherein the liquid crystal display drive and control device further includes a plurality of mode terminals configured to determine which of the first serial interface circuit and the second serial interface circuit and the parallel interface circuit is to be used as an interface with the host device.

10. A liquid crystal display drive and control device according to claim 9,
wherein in an operation mode which uses the first serial interface circuit as the interface with the host device, the host interface circuit enables information received by the first serial interface circuit to be output from the parallel interface circuit to the sub liquid crystal display drive and control device.

11. A liquid crystal display drive and control device according to claim 10,
wherein the host interface circuit further comprises a frame-synchronizing signal output terminal configured to output a frame-synchronizing signal for instructing timing for fetching the display data by frame synchronization, and
wherein in the operation mode which uses the first serial interface circuit as the interface with the host device, the host interface circuit enables the frame-synchronizing signal input from outside the liquid crystal display drive and control device to be output from the frame-synchronizing signal output terminal to the host device when image information received by the first serial interface circuit can be output from the parallel interface circuit to outside of the liquid crystal display drive and control device.

12. A mobile display system comprising:
a first case comprising a liquid crystal display panel, a liquid crystal display drive and control device, a sub liquid crystal display panel, and a sub liquid crystal display drive and control device;
a second case comprising a host device;
a hinge connected between the first case and the second case;
wherein the liquid crystal display drive and control device is adapted for use with the host device, the liquid crystal display panel, and the sub liquid crystal display drive and control device for the sub liquid crystal display panel, the liquid crystal display drive and control device comprising:
a high speed serial interface circuit adapted for direct connection with the host device;
a low speed serial interface circuit adapted for connection with the host device;
a drive circuit which generates a drive signal for driving the liquid crystal display panel on the basis of information input to the host interface circuit;
an output port directly coupled to the sub liquid crystal display drive and control device for the sub liquid crystal display panel to control the sub-display driver for the sub liquid crystal display panel on the basis of the information input to the host interface circuit;
a parallel interface directly coupled to the sub liquid crystal display drive and control device for the sub liquid crystal display panel to send data or commands; and
mode terminals for receiving mode determination signals for determining which of the first serial interface circuit and the second serial circuit and the parallel interface circuit is to be used as an interface with the host device.

13. A mobile display system according to claim 12,
wherein the output port comprises a plurality of port terminals, and port registers, and
wherein data for deciding an output logic value of each of the port terminals to the sub-display driver for a sub-display panel is set in the respective port registers.

14. A liquid crystal display drive and control device adapted for use with a host device, a liquid crystal display panel, a sub liquid crystal display drive and control device for a sub liquid crystal display panel, and a peripheral device, the liquid crystal display drive and control device comprising:
a first serial interface circuit adapted for direct connection with the host device;
a drive circuit which generates a drive signal for driving the liquid crystal display panel on the basis of information input to the host interface circuit;
an output port directly coupled to the sub liquid crystal display drive and control device and the peripheral device to control the sub liquid crystal display drive and control device for the sub liquid crystal display panel and the peripheral device on the basis of the information input to the first serial interface circuit; and
a parallel interface directly coupled to the sub liquid crystal display drive and control device for the sub liquid crystal display panel device to send data or commands.

15. A liquid crystal display drive and control device according to claim 14,
wherein the output port comprises a plurality of port terminals coupled to the sub liquid crystal display drive and control device and the peripheral device, and port registers, and
wherein data for deciding an output logic value of each of the port terminals to the sub liquid crystal display drive and control device for the sub liquid crystal display panel and the peripheral device is set in the respective port registers.

16. A liquid crystal display drive and control device according to claim 15, further comprising:
a display memory for storing display data,
wherein the drive circuit generates a gate drive signal and a source drive signal for driving the liquid crystal display panel according to the display data stored in the display memory.

17. A liquid crystal display drive and control device according to claim 16,
wherein the first serial interface circuit is adapted to interface with the host device, and
wherein the first serial interface circuit comprises differential terminals for input of serial data.

18. A liquid crystal display drive and control device according to claim 17,
wherein the host interface circuit further comprises:
a plurality of mode terminals for receiving mode determination signals for determining which of the first serial interface circuit and the parallel interface circuit is to be used as an interface with the host device.

19. A liquid crystal display drive and control device according to claim 18,
wherein in an operation mode which uses the first serial interface circuit as an interface with the host device, the host interface circuit enables information received by the first serial interface circuit to be output to the drive circuit, and to be output from the parallel interface circuit to the sub liquid crystal display drive and control device.

20. A liquid crystal display drive and control device according to claim 19,
wherein in the operation mode which uses the first serial interface circuit as the interface with the host device, the host interface circuit outputs strobe signals necessary for parallel interfacing when outputting the information received by the first serial interface circuit from the parallel interface circuit to the sub liquid crystal display drive and control device.

21. A liquid crystal display drive and control device according to claim 20,
wherein the host interface circuit comprises a frame-synchronizing signal output terminal configured to output a frame-synchronizing signal for instructing timing for fetching the display data through frame synchronization, and
wherein in the operation mode which uses the first serial interface circuit as the interface with the host device, the host interface circuit enables the frame-synchronizing signal input from outside of the liquid crystal display drive and control device to be output from the frame-synchronizing signal output terminal to the host device when image information received by the first serial interface circuit can be output from the parallel interface circuit to the sub liquid crystal display drive and control device.

22. A mobile display system comprising:
a first case comprising a liquid crystal display panel, a liquid crystal display drive and control device, a sub liquid crystal display panel, a sub liquid crystal display drive and control device, and a peripheral device;
a second case comprising a host device; and
a hinge connected between the first case and the second case;
wherein the liquid crystal display drive and control device is adapted for use with the host device, the liquid crystal display panel, and the sub liquid crystal display drive and control device for the sub liquid crystal display panel, the liquid crystal display drive and control device comprising:
a high speed serial interface circuit adapted for direct connection with the host device;
a low speed serial interface circuit adapted for connection with the host device;
a drive circuit which generates a drive signal for driving the liquid crystal display panel on the basis of information input to the host interface circuit;
an output port directly coupled to the sub liquid crystal display drive and control device for the sub liquid crystal display panel and the peripheral device to control the sub-display driver for the sub liquid crystal display panel and the peripheral device on the basis of the information input to the host interface circuit;
a parallel interface directly coupled to the sub liquid crystal display drive and control device for the sub liquid crystal display panel to send data or commands; and
a plurality of mode terminals for receiving mode determination signals for determining which of the first serial interface circuit and the second serial circuit and the parallel interface circuit is to be used as an interface with the host device.

23. A mobile display system according to claim 22,
wherein the output port comprises a plurality of port terminals, and port registers, and
wherein data for deciding an output logic value of each of the port terminals to the sub-display driver for a sub-display panel and the peripheral device is set in respective port registers.

24. A mobile display system comprising:
a first case comprising a liquid crystal display panel, a liquid crystal display drive and control device, and a peripheral device;
a second case comprising a host device;
a hinge connected between the first case and the second case;
wherein the liquid crystal display drive and control device is adapted for use with the host device, the liquid crystal display panel, and the peripheral device, the liquid crystal display drive and control device comprising:
a high speed serial interface circuit adapted for direct connection with the host device;
a low speed serial interface circuit adapted for connection with the host device;
a drive circuit which generates a drive signal for driving the liquid crystal display panel on the basis of information input to the host interface circuit;
an output port directly coupled to the peripheral device to control the peripheral device on the basis of the information input to the host interface circuit;
a parallel interface; and
mode terminals for receiving mode determination signals for determining which of the first serial interface circuit and the second serial circuit and the parallel interface circuit is to be used as an interface with the host device.

25. A mobile display system according to claim 24,
wherein the output port comprises a plurality of port terminals, and port registers, and
wherein data for deciding an output logic value of each of the port terminals to the peripheral device is set in the respective port registers.

* * * * *